United States Patent [19]
Goldberg

[11] Patent Number: 6,061,573
[45] Date of Patent: *May 9, 2000

[54] METHOD AND APPARATUS IN A RADIO COMMUNICATION SYSTEM FOR SYNCHRONIZING TRANSMISSIONS WHILE MAINTAINING FULL USER TRAFFIC

[75] Inventor: Steven Jeffrey Goldberg, Fort Worth, Tex.

[73] Assignee: Motorola, Inc., Schaumburg, Ill.

[ * ] Notice: This patent is subject to a terminal disclaimer.

[21] Appl. No.: 09/001,306

[22] Filed: Dec. 31, 1997

Related U.S. Application Data

[63] Continuation-in-part of application No. 08/803,741, Feb. 21, 1997, Pat. No. 5,873,044.

[51] Int. Cl.$^7$ ...................................................... H04B 7/005
[52] U.S. Cl. ................................. 455/503; 455/67; 455/6
[58] Field of Search ................................. 455/502, 503, 455/524, 67.6, 67.1

[56] References Cited

U.S. PATENT DOCUMENTS

| | | |
|---|---|---|
| 4,188,582 | 2/1980 | Cannalte et al. |
| 4,709,401 | 11/1987 | Akerberg . |
| 5,257,404 | 10/1993 | Goreham et al. ........................ 455/503 |
| 5,361,398 | 11/1994 | Christian et al. ........................ 455/503 |
| 5,416,808 | 5/1995 | Witsaman et al. ........................ 455/503 |
| 5,873,044 | 2/1999 | Goldberg et al. ........................ 455/503 |

Primary Examiner—Reinhard J. Eisenzopf
Assistant Examiner—Greta J. Fuller
Attorney, Agent, or Firm—R. Louis Breeden

[57] ABSTRACT

A base station (214) synchronizes a data stream of a second transmitter (202) with that of a first transmitter while maintaining full user traffic through a radio communication system (200). The first and second transmitters transmit (501), during a first time interval, a first portion of the user traffic in a simulcast mode; and at least the first transmitter transmits (503), during a second time interval, a second portion of the user traffic in a non-simulcast mode. A receiver (204) proximate the second transmitter monitors (505) the second portion of the user traffic transmitted from the first transmitter to determine a time delay, and then adjusts (507) a launch time of the second transmitter in accordance with the time delay.

15 Claims, 3 Drawing Sheets

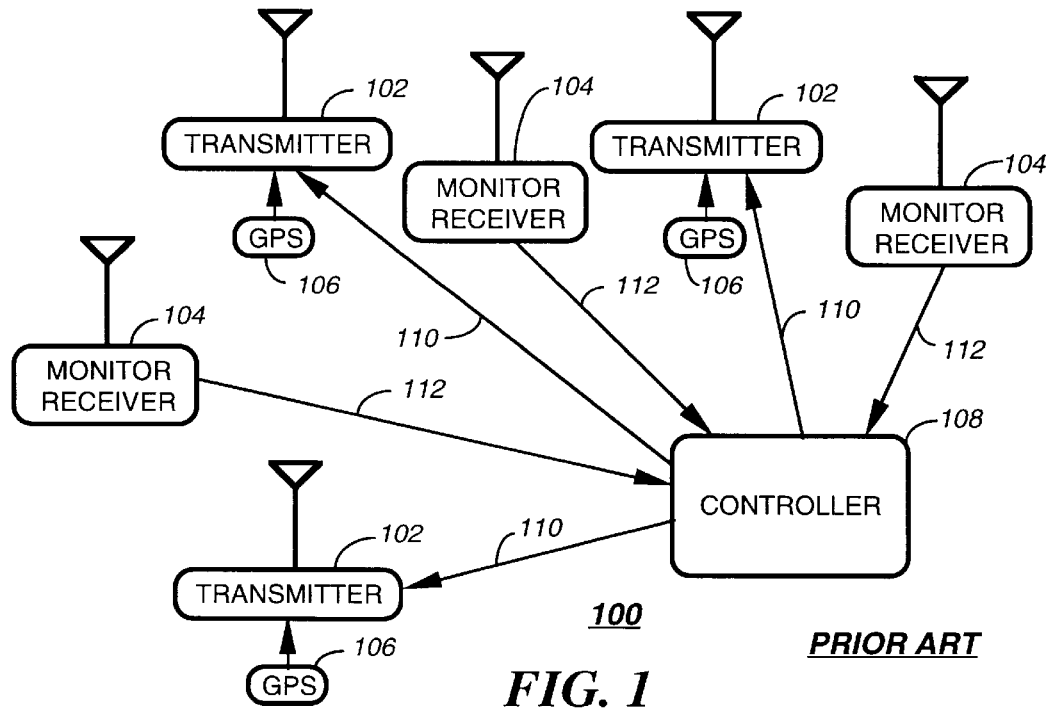
FIG. 1 *PRIOR ART*
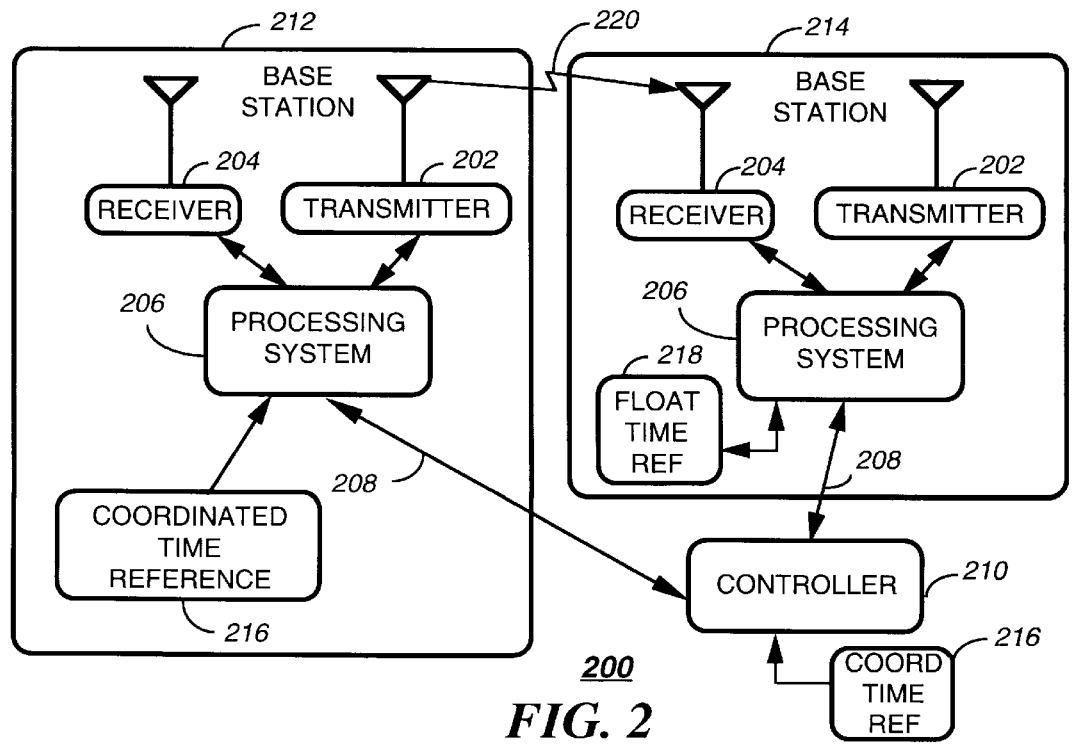
FIG. 2

METHOD AND APPARATUS IN A RADIO COMMUNICATION SYSTEM FOR SYNCHRONIZING TRANSMISSIONS WHILE MAINTAINING FULL USER TRAFFIC

RELATED APPLICATION

This application is a continuation-in-part of application Ser. No. 08/803,741, filed Feb. 21, 1997 by Goldberg et al., entitled "METHOD AND APPARATUS IN A RADIO COMMUNICATION SYSTEM FOR SYNCHRONIZING TRANSMISSIONS WHILE MAINTAINING FULL USER TRAFFIC." Said application is hereby incorporated herein by reference.

FIELD OF THE INVENTION

This invention relates in general to radio communication systems, and more specifically to a method and apparatus for synchronizing transmissions while maintaining full user traffic.

BACKGROUND OF THE INVENTION

Radio communication systems when designed for specific telecommunications markets, such as messaging and paging, are ordinarily designed to utilize simulcast techniques. Simulcast is a cost effective and fundamental feature required for the wide area delivery of today's messaging protocols to large service areas with thousands of roaming subscriber devices. It allows for the transmission of the protocols to reach into areas and buildings not easily accessible by other technologies, while providing additive signal levels in over-lapping service areas. A fundamental precept is that each transmitter in a region will send data with symbol transitions occurring very close to the same time mark as symbol transitions from adjacent transmitters. Precisely how close is dependent on constraints of the signaling stream utilized, distances between transmitters in the system, tolerable delay spread, error budgets, etc. For the transmitters to meet their portion of the allowable symbol transition tolerance, the time accuracy of the signal leaving the transmitting antenna must be controlled to within tens of microseconds or less.

Present radio communications systems often utilize Global Positioning System (GPS) receivers to provide both transmitter oscillator disciplining for transmitter stability and highly accurate simulcast synchronization for groups of overlapping transmitters. In addition to the use of GPS receivers for accurate timing, other highly accurate timing references have been used for similar purposes. These references include the use of T-Carrier span-line network clock references, Universal Time Coordinated (UTC) signals from High Frequency Single Side Band (HF-SSB) or Long Range Navigation (LORAN) receiver/synchronizers, or timing signals from a Cesium or Rubidium atomic clock reference. It should be noted that to ensure accurate synchronization among multiple over-lapping transmitters, the transmitters preferably use similar types of timing references. Since the above time references are expensive, it is desirable to minimize and/or replace them with less costly solutions.

Thus, what is needed is a method and apparatus for making relative timing adjustments for simulcast transmissions in a cost effective manner. The method and apparatus preferably should be transparent to system operation and equipment variances.

SUMMARY OF THE INVENTION

An aspect of the present invention is a method in a radio communication system for synchronizing a data stream of a second transmitter with that of a first transmitter while maintaining full user traffic through the radio communication system. The method comprises the steps of transmitting, by the first and second transmitters during a first time interval, a first portion of the user traffic in a simulcast mode; and transmitting by at least the first transmitter during a second time interval, a second portion of the user traffic in a non-simulcast mode. The method further comprises the steps of monitoring, by a receiver proximate the second transmitter, the second portion of the user traffic transmitted from the first transmitter to determine a time delay; and adjusting a launch time of the second transmitter in accordance with the time delay.

Another aspect of the present invention is a base station in a radio communication system for synchronizing a data stream of a second transmitter with that of a first transmitter while maintaining full user traffic through the radio communication system. The base station comprises the second transmitter for transmitting, with the first transmitter during a first time interval, a first portion of the user traffic in a simulcast mode. The first transmitter transmits during a second time interval, a second portion of the user traffic in a non-simulcast mode. The base station further comprises a processing system coupled to the second transmitter for controlling the second transmitter, and a receiver proximate the second transmitter and coupled to the processing system for monitoring the second portion of the user traffic transmitted from the first transmitter to determine a time delay. The processing system is programmed to adjust a launch time of the second transmitter in accordance with the time delay.

Another aspect of the present invention is a radio communication system for synchronizing a data stream of a second transmitter with that of a first transmitter while maintaining full user traffic through the radio communication system. The radio communication system comprises the first and second transmitters for transmitting, during a first time interval, a first portion of the user traffic in a simulcast mode. At least the first transmitter transmits, during a second time interval, a second portion of the user traffic in a non-simulcast mode. The radio communication system further comprises first and second processing systems coupled, respectively, to the first and second transmitters for controlling the first and second transmitters; and a receiver proximate the second transmitter and coupled to the second processing system for monitoring the second portion of the user traffic transmitted from the first transmitter to determine a time delay. The second processing system is programmed to adjust a launch time of the second transmitter in accordance with the time delay.

BRIEF DESCRIPTION OF THE DRAWINGS

FIG. 1 is an electrical block diagram of a prior art radio communication system.

FIG. 2 is an exemplary electrical block diagram of a radio communication system in accordance with the present invention.

DETAILED DESCRIPTION OF THE DRAWINGS

Figure 3:
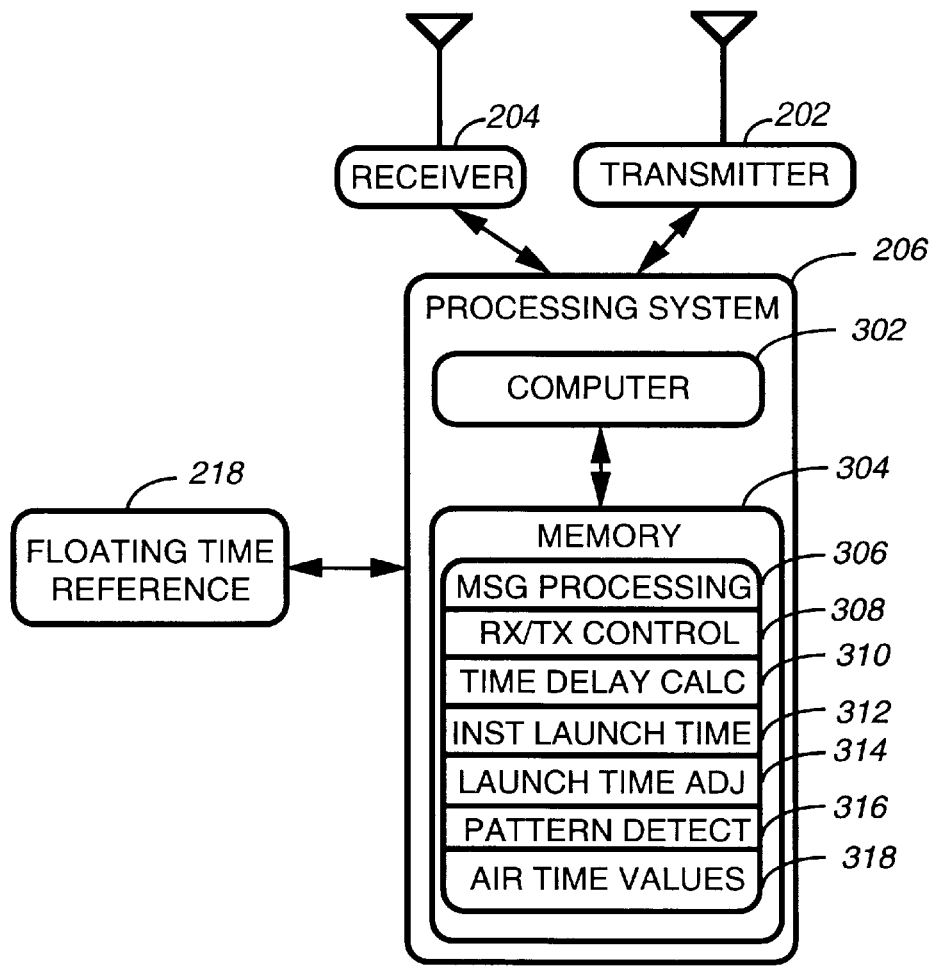
FIG. 3 is an exemplary electrical block diagram of a base station in accordance with the present invention.

Referring to FIG. 1, an electrical block diagram depicts a prior art radio communication system 100 comprising a plurality of transmitters 102 coupled by outbound communication links 110 to a controller 108 for controlling the transmitters 102 to transmit messages to portable subscriber units (not shown). The prior art radio communication system 100 further comprises a plurality of monitor receivers 104 coupled by inbound communication links 112 for receiving inbound channel communications from the portable subscriber units. Each of the transmitters 102 is coupled to a Global Positioning Satellite (GPS) receiver 106, which is used for setting the simulcast launch time, and disciplining the local oscillator. The controller 108 batches messages together, and sends them to each transmitter 102 with a specified launch time. When this launch time occurs, the transmitters 102 all send the same data during the simulcast portion of the transmission cycle. As discussed herein above in the Background, the GPS receivers 106 are expensive, and it is thus desired to eliminate them.

For local oscillator disciplining, alternative techniques exist. The alternative techniques include monitoring terrestrial radio time signals, such as the Radio Station WWV signal of the U. S. National Bureau of Standards. Other alternatives include Rubidium clocks and sending a continuous stream of timing ticks over the outbound communication links 110. Simulcast synchronization, however, becomes much more challenging without the GPS receivers 106 at every transmitter 102, and is the subject of the remainder of this disclosure.

Referring to FIG. 2, an exemplary electrical block diagram depicts a radio communication system 200 in accordance with the present invention. The radio communication system 200 comprises at least first and second base stations 212, 214 coupled by communication links 208 to a controller 210 for controlling the transmitters 202 to transmit messages to portable subscriber units (not shown). The base stations 212, 214 each comprise a transmitter 202 and a receiver 204 for monitoring the transmitter 202 of another base station 212, 214 to determine a time delay in accordance with the present invention, as described further below. The receiver 204 and the transmitter 202 are coupled to a processing system 206 for controlling the transmitter 202 and the receiver 204. Preferably, at least one of the base stations 212 further comprises a coordinated time reference 216, such as a GPS receiver, so that the overall system timing does not drift significantly in absolute time. Alternatively, the coordinated time reference 216 can be a non-GPS system, for example, a terrestrial radio time reference system. Other base stations 214 preferably further comprise a floating time reference 218, which is kept synchronized to the coordinated time reference 216, as described further below. The controller 210 batches messages together, and sends them to each base station 212, 214 with a specified launch time. When this launch time occurs, the transmitters 202 all send the same data during the simulcast portion of the transmission cycle.

During a second portion of the transmission cycle, the system 200 preferably transmits non-simulcast user data from selected ones of the transmitters 202 on different frequencies, repeating frequency use when the distances between the transmitters 202 are such that the transmissions will not interfere with each other. A primary advantage of the non-simulcast portion of the transmission is to save frequency spectrum through directed transmissions with frequency reuse. An important secondary advantage is that the receivers 204 can also be used in accordance with the present invention to monitor the non-simulcast portion to measure and equalize the transmission delay in preparation for the next simulcast portion. The receivers 204 are instructed by the processing systems 206, in cooperation with the controller 210 to listen to different frequencies at different times in order to build a profile of reception time marks (preferably synchronization words already present in the protocol) from at least one transmitter 202 of an adjacent base station 212, 214 via a radio transmission path 220 having a known transmission time. The receiver 204 informs the processing system 206 of the timing of the time marks, and the timing is compared with the instructed launch times corresponding to messages associated with each received time mark to determine whether and how to adjust the floating time reference 218 to keep the associated transmitter 202 synchronized.

The transmitter 202 is preferably similar to the RF-Orchestra!™ transmitter manufactured by Motorola, Inc. The hardware of the receiver 204 is preferably similar to that of the RF-Audience!™ inbound base receiver, also manufactured by Motorola, Inc. It will be appreciated that other similar hardware can be utilized as well for the transmitter 202 and the receiver 204.

The communication protocol used between the controller 210 and the base stations 212, 214 is preferably similar to Motorola's well-known Outbound Paging Protocol (OPP). The outbound over-the-air protocol transmitted by the transmitters 202 is preferably a member of Motorola's well-known FLEX™ family of messaging protocols. It will be appreciated that, alternatively, other suitable protocols can be utilized as well to accomplish these communication functions.

The controller 210 preferably is coupled to the Public Switched Telephone Network (not shown) for receiving user traffic comprising messages from message originators. The controller 210 is programmed to control the transmitters 202 to transmit, during a first time interval, a first portion of the user traffic in a simulcast mode and to transmit during a second time interval, a second portion of the user traffic in a non-simulcast mode, using well-known techniques. A coordinated time reference 216, preferably a GPS receiver, is coupled to the controller 210 for providing a time signal thereto.

In the preferred embodiment, the device determining the reception times of the time marks is the receiver 204, in cooperation with the processing system 206, and the time delay of the transmitter is calculated by:

$$T_{delay} = T_{received} - T_{instructed\_launch\_time} - T_{air\_time}$$

$T_{air\_time}$ is estimated based upon the known distance between the transmitters 202 and the receivers 204, via, for example, the radio transmission path 220. The processing system 206 is programmed with a table of $T_{air\_time}$ values corresponding to the combinations of transmitters 202 and receivers 204 that are used in the synchronization process. $T_{instructed\_launch\_time}$ is transmitted to the processing system 206 by the controller 210 along with the message, using well-known techniques. $T_{received}$ is known to the processing system 206 within the accuracy of the floating time reference 218. Timing error in the floating time reference 218 introduces a corresponding error in measuring the absolute time delay. The value calculated for $T_{delay}$ is the value by which the floating time reference 218 should be adjusted to synchronize the floating time reference 218 with the coordinated time reference 216. To keep the radio communication system 200 synchronized with other similar systems, a GPS or equivalent coordinated time reference 216 traceable to a Universal Time Coordinated (UTC) signal is needed at least once, preferably at the first base station 212 at which the synchronization process starts. The controller 210 preferably is aware which base station 212 is so equipped, so that the synchronization process always begins with respect to the coordinated time reference 216, and then propagates from there. For example, in the embodiment of the radio communication system 200 depicted in FIG. 2, the coordinated time reference 216 is located at the base station 212. The controller 210 preferably instructs the base station 214 to determine the reception times of timing marks (e.g., existing synchronization words) in non-simulcast portions of the user data to be transmitted by the transmitter 202 of the base station 212. Advantageously, the radio communication system 200 in accordance with the present invention does not have to interrupt the user data transmissions or transmit additional special data over the air to synchronize the transmitter 202.

The receiver 204 of the base station 214 measures and reports the reception times of the timing marks to the associated processing system 206. The processing system 206 subtracts the instructed launch time and the known air time corresponding to the transmission path 220 from the corresponding reception time to determine the time delay $T_{delay}$, as in the formula herein above. Because $T_{delay}$ primarily represents timing error in the floating time reference 218 of the base station 214, its value can be positive or negative, depending upon the direction of the time reference drift. The floating time reference 218 of the base station 214 preferably is then instructed by the processing system 206 of the base station 214 to adjust its time by an algebraic subtraction of $T_{delay}$ from its currently set time. As a result of the adjustment, the measured transmitter 202 will be synchronized for simulcast. While this adjustment is most important for the periods when simulcast transmissions are occurring, it also advantageously serves to improve system performance for synchronization of the portable subscriber units to the system protocol timing during non-simulcast data transmissions. It will be appreciated that, alternatively, the floating time reference 218 can be left unchanged, and the instructed launch time can be modified in accordance with the time delay. This alternative approach is less desirable, however, because the floating time reference 218 can drift substantially over time, reducing the resolution of launch time correction and possibly causing other timing related difficulties.

Once the floating time reference 218 of the base station 214 has been recalibrated as described above, further non-simulcast transmissions of the base station 214 using the recalibrated time reference can be monitored by other similar base stations 214 (not shown), thereby propagating the synchronization process throughout the radio communication system.

It will be appreciated that in a very large system more than one coordinated time reference 216 can be desirable, so that the recalibration process can be completed more quickly in all parts of the system. Having more than one coordinated time reference 216 also helps control cumulative timing errors introduced as the recalibration process propagates through the system. In addition, more than one coordinated time reference 216 is required when a system contains isolated groups of base stations 214 that cannot monitor other base stations 212, 214 of the system.

Referring to FIG. 3, an exemplary electrical block diagram depicts the base station 214 in accordance with the present invention. The base station 214 comprises the transmitter 202 and the receiver 204 coupled to the processing system 206. The processing system 206 is coupled to the floating time reference 218. The processing system 206 comprises a conventional computer 302 and a conventional memory 304. The memory 304 includes locations for storing variables and software elements used in controlling the operation of the base station 214 in accordance with the present invention, such as a message processing element 306 for processing outbound messages. The memory further comprises a receiver/transmitter control element 308 for controlling the receiver 204 and the transmitter 202 in accordance with the present invention. Also included in the memory 304 is a time delay calculation element 310 for calculating the time delay $T_{delay}$ as described herein above. The memory 304 further comprises a location for storing an instructed launch time 312 received with an outbound message from the controller 210. The memory 304 also includes a launch time adjustment element 314 for adjusting the launch time of the outbound message in accordance with the present invention. In addition, the memory 304 includes a pattern detection element 316 for determining a time at which a predetermined recurring bit pattern in the second portion of the user traffic is received by the receiver 204. The memory 304 also includes air time values 318, preferably received from the controller 210 describing known transmission times $T_{air\_time}$ from nearby base stations 212, 214.

The base station 212 is similar to the base station 214, the essential difference being that in the base station 212 the coordinated time reference 216 is substituted for the floating time reference 218. Thus, the base station 212 does not require the time delay calculation element 310, the launch time adjustment element 314, or the bit pattern detection element 316, because no adjustment is necessary for the coordinated time reference 216 of the base station 212.

Figure 4:
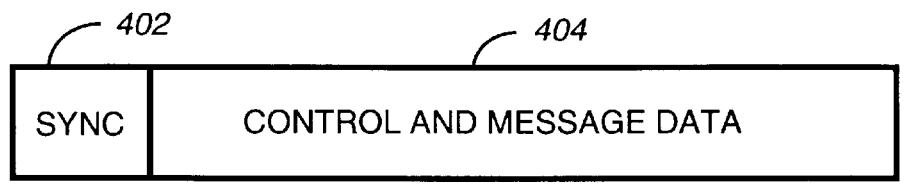
FIG. 4 is an exemplary diagram depicting a portion of an outbound protocol in accordance with the present invention.

Referring to FIG. 4, an exemplary diagram depicts a portion of an outbound protocol in accordance with the present invention. The protocol comprises a synchronization word 402 and control and message data 404. Using well-known techniques, the receiver 204 preferably synchronizes with the synchronization word 402 and then cooperates with to the processing system 206 and the floating time reference 218 to determine the reception time. Portions of the associated control and message data 404 also are reported to the processing system 206, so that the processing system 206 can identify the transmission and thus the launch time assigned by the controller 210.

The sync word portion of the transmission allows determining the reception time to the resolution of a symbol period. Due to noise there will be jitter on the edges of the symbols. The jitter is removed by considering the received edges of multiple symbols, and assuming the received edges are uniformly random around the actual transmission times. The jitter can therefore be averaged out. While the sync word itself may provide adequate averaging, a more robust implementation preferably uses a larger portion, e.g., all, of the data stream. This is possible even though the received control and message data 404 is random as far as the receiver 204 is concerned. Any detectable symbol transition is another timing mark to improve the overall resolution of the received time of the synchronization word 402.

Figure 5:
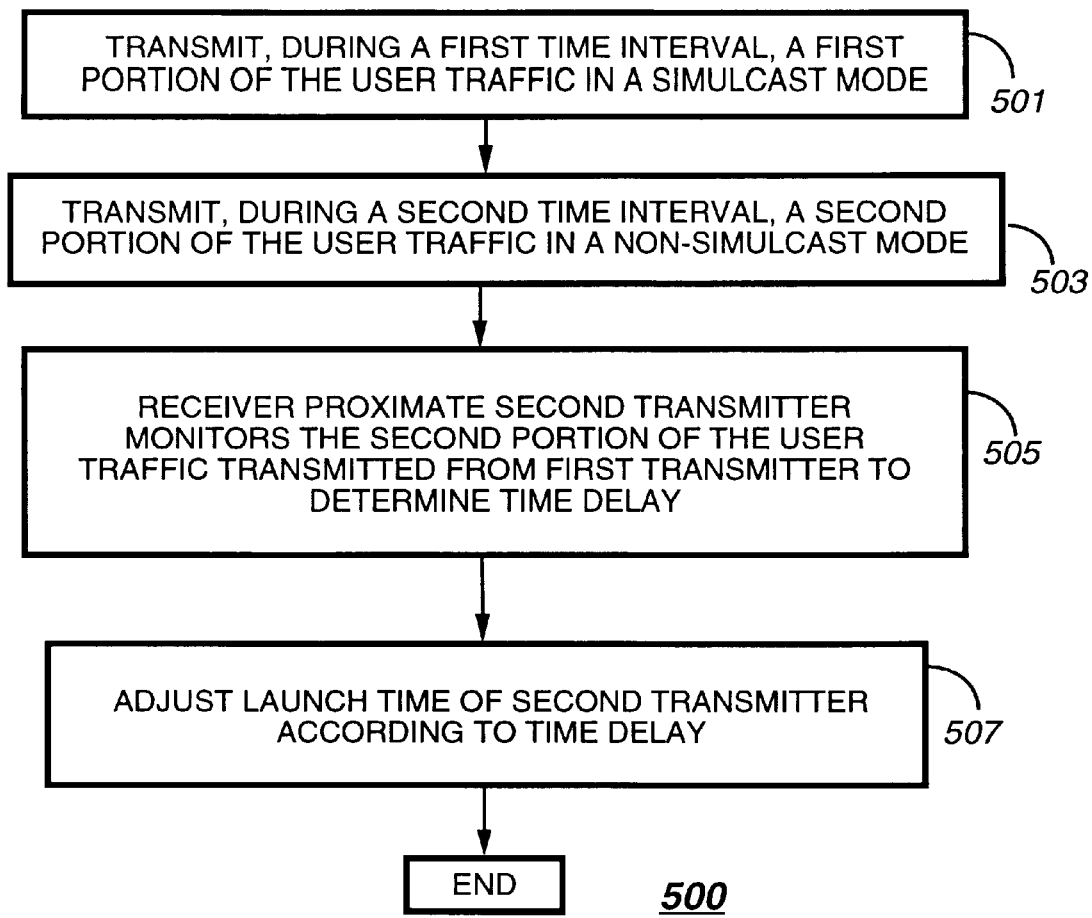
FIG. 5 is a flow chart depicting operation of the radio communication system in accordance with the present invention.

Referring to FIG. 5, a flow chart 500 depicts operation of the radio communication system 200 in accordance with the present invention. The flow begins with the system 200 transmitting 501, during a first time interval, a first portion of the user traffic in a simulcast mode. This is done, for example, to convey information such as control information intended for subscriber units throughout the system. The simulcast mode transmissions can also include location request messages to determine the locations of portable subscriber units for which messages are ready to be sent in the following non-simulcast mode transmission. Next, the system 200 transmits 503, during a second time interval, a second portion of the user traffic in a non-simulcast mode. This is done, for example, to send different individual messages to specific, localized portions of the system. The second portion of the user traffic from selected transmitters 202, e.g., transmitters within range, is monitored 505 by a receiver 204 controlled ultimately by the controller 210, which preferably selects as a starting point a receiver 204 of a base station 214 near another base station 212 having the coordinated time reference 216. The receiver 204 and the processing system 206 of the base station 214 determine the time delay $T_{delay}$ from the time at which a predetermined recurring bit pattern, e.g., the synchronization word 402, is received from the transmitter 202, indicating the receipt of the second portion of the user traffic. The time delay is then used by the processing system 206 to adjust 507 the launch time of the transmitter 202 of the base station 214. Preferably the launch time adjustment is made by the processing system 206 cooperating with the floating time reference 218 to adjust the floating time reference 218 to recalibrate the floating time reference 218 and synchronize the transmission times of the transmitters 202. Alternatively, the processing system 206 can simply adjust the instructed launch time 312 in accordance with the time delay. Once the launch time 218 of the base station 214 has been recalibrated as described above, the base station 214 can be utilized by other base stations 214 to recalibrate their launch times. In this manner, the recalibration process can propagate through the system. It will be appreciated that, as the recalibration process propagates, a plurality of recalibrations can take place simultaneously, thereby speeding the recalibration of the system. It will be further appreciated that to achieve further robustness in the recalibration process, the base station 214 can monitor more than one coordinated base station 212 or recalibrated base station 214 and average the time delays calculated therefor.

Thus, it should be clear that the present invention advantageously provides a method and apparatus for making relative timing adjustments for simulcast transmissions in a cost effective manner. The method and apparatus are transparent to system operation and equipment variances, requiring no interruption of user traffic and no protocol timing information other than synchronization and launch time signals already present in the over-the-air communication protocol.

It will be appreciated by one of ordinary skill in the art that the disclosed invention can be modified in numerous ways and can assume many embodiments other than the embodiments specifically set out and described above. Accordingly, it is intended that the appended claims cover all modifications which fall within the scope of the invention.

What is claimed is:

1. A method in a radio communication system for synchronizing a data stream of a second transmitter with that of a first transmitter while maintaining full user traffic through the radio communication system, the method comprising the steps of:
    transmitting, by the first and second transmitters during a first time interval, a first portion of the user traffic in a simulcast mode;
    transmitting by at least the first transmitter during a second time interval, a second portion of the user traffic in a non-simulcast mode;
    monitoring, by a receiver proximate the second transmitter, the second portion of the user traffic transmitted from the first transmitter to determine a time delay; and
    adjusting a launch time of the second transmitter in accordance with the time delay.

2. The method of claim 1, wherein the adjusting step comprises the step of
    adjusting a time reference of the second transmitter in accordance with the time delay.

3. The method of claim 1, wherein the adjusting step comprises the step of
    adjusting an instructed launch time of the second transmitter in accordance with the time delay.

4. The method of claim 1, wherein the monitoring step comprises the step of
    calculating the time delay from a time of receipt of the second portion of the user traffic, an instructed launch time, and a known transmission time between the first transmitter and the receiver.

5. The method of claim 1, wherein the monitoring step comprises the step of
    determining a time at which a predetermined recurring bit pattern in the second portion of the user traffic is received by the receiver.

6. The method of claim 1,
    wherein the step of transmitting the second portion of the user traffic comprises the step of transmitting from the first transmitter synchronized by a coordinated time reference.

7. The method of claim 1,
    wherein the step of transmitting the second portion of the user traffic comprises the step of transmitting from the first transmitter synchronized by a floating time reference.

8. A base station in a radio communication system for synchronizing a data stream of a second transmitter with that of a first transmitter while maintaining full user traffic through the radio communication system, the base station comprising:
    the second transmitter for transmitting, with the first transmitter during a first time interval, a first portion of the user traffic in a simulcast mode, wherein at least the first transmitter transmits during a second time interval, a second portion of the user traffic in a non-simulcast mode;
    a processing system coupled to the second transmitter for controlling the second transmitter; and
    a receiver proximate the second transmitter and coupled to the processing system for monitoring the second portion of the user traffic transmitted from the first transmitter to determine a time delay,
    wherein the processing system is programmed to adjust a launch time of the second transmitter in accordance with the time delay.

9. The base station of claim 8, wherein the processing system is further programmed to
    adjust a time reference of the second transmitter in accordance with the time delay.

10. The base station of claim 8, wherein the processing system is further programmed to
    adjust an instructed launch time of the second transmitter in accordance with the time delay.

11. The base station of claim 8, wherein the processing system is further programmed to
    calculate the time delay from a time of receipt of the second portion of the user traffic, an instructed launch time, and a known transmission time between the first transmitter and the receiver.

12. The base station of claim 8, wherein the processing system is further programmed to cooperate with the receiver to determine a time at which a predetermined recurring bit pattern in the second portion of the user traffic is received by the receiver.

13. A radio communication system for synchronizing a data stream of a second transmitter with that of a first transmitter while maintaining full user traffic through the radio communication system, the radio communication system comprising:

the first and second transmitters for transmitting, during a first time interval, a first portion of the user traffic in a simulcast mode, wherein at least the first transmitter transmits, during a second time interval, a second portion of the user traffic in a non-simulcast mode;

first and second processing systems coupled, respectively, to the first and second transmitters for controlling the first and second transmitters; and a receiver proximate the second transmitter and coupled to the second processing system for monitoring the second portion of the user traffic transmitted from the first transmitter to determine a time delay, wherein the second processing system is programmed to adjust a launch time of the second transmitter in accordance with the time delay.

14. The radio communication system of claim 13, wherein the first transmitter comprises a coordinated time reference coupled to the first processing system for synchronizing the second portion of the user traffic.

15. The radio communication system of claim 13, wherein the first transmitter comprises a floating time reference coupled to the first processing system for synchronizing the second portion of the user traffic.

* * * * *